(12) United States Patent
Halsey

(10) Patent No.: US 7,567,418 B2
(45) Date of Patent: Jul. 28, 2009

(54) THERMAL ISOLATING TORQUE TUBE

(75) Inventor: David G. Halsey, Rockford, IL (US)

(73) Assignee: United Technologies Corporation, Hartford, CT (US)

(*) Notice: Subject to any disclaimer, the term of this patent is extended or adjusted under 35 U.S.C. 154(b) by 466 days.

(21) Appl. No.: 11/271,577

(22) Filed: Nov. 10, 2005

(65) Prior Publication Data
US 2007/0137971 A1 Jun. 21, 2007

(51) Int. Cl.
H02K 9/00 (2006.01)
(52) U.S. Cl. .......................... 361/139; 310/52
(58) Field of Classification Search .............. 310/52, 310/103, 105, 216; 361/19, 139
See application file for complete search history.

(56) References Cited

U.S. PATENT DOCUMENTS

| | | | |
|---|---|---|---|
| 4,063,122 A * | 12/1977 | Kullmann et al. | 310/64 |
| 4,207,745 A * | 6/1980 | Pouillange | 62/50.7 |
| 4,237,392 A * | 12/1980 | Ying et al. | 310/52 |
| 4,538,417 A * | 9/1985 | Eckels | 62/50.7 |
| 4,642,495 A * | 2/1987 | Mori et al. | 310/52 |
| 5,880,547 A | 3/1999 | Shoykhet | |
| 6,078,731 A | 6/2000 | Arold et al. | |
| 6,129,477 A | 10/2000 | Shoykhet | |
| 6,176,184 B1 | 1/2001 | Mudry | |
| 6,336,986 B1 | 1/2002 | Lee et al. | |
| 6,664,672 B2 | 12/2003 | Kalsi et al. | |
| 6,700,274 B2 | 3/2004 | Gamble et al. | |
| 6,782,771 B2 * | 8/2004 | Oka et al. | 74/388 PS |
| 6,796,739 B1 | 9/2004 | Shoykhet | |
| 6,815,856 B2 | 11/2004 | Maguire et al. | |
| 6,821,112 B2 * | 11/2004 | Eigler et al. | 425/549 |
| 6,836,043 B2 | 12/2004 | Boss et al. | |
| 6,873,079 B2 | 3/2005 | Maguire et al. | |
| 7,294,947 B2 * | 11/2007 | Corbin et al. | 310/103 |
| 2002/0145355 A1 | 10/2002 | Maguire et al. | |
| 2003/0052568 A1 | 3/2003 | Howard | |
| 2003/0222533 A1 | 12/2003 | Gamble et al. | |
| 2004/0075349 A1 | 4/2004 | Boss et al. | |
| 2004/0135463 A1 | 7/2004 | Maguire et al. | |
| 2004/0151537 A1 | 8/2004 | Shoykhet | |

* cited by examiner

Primary Examiner—Danny Nguyen
(74) Attorney, Agent, or Firm—Kinney & Lange, P.A.

(57) ABSTRACT

A torque tube assembly for transmitting rotational force from a first end to a second end includes a number n of concentric elongate torque tubes, where n is an odd integer greater than or equal to three. The concentric elongate torque tubes are connected for co-rotation. A serpentine thermal conduction path is defined between the first end of the torque tube assembly and the second end of the torque tube assembly, and includes at least a portion of each of the concentric elongate torque tubes.

20 Claims, 2 Drawing Sheets

THERMAL ISOLATING TORQUE TUBE

BACKGROUND OF THE INVENTION

The present invention relates to torque transmitting assemblies, and more particularly to thermal isolating torque transfer assemblies for use with superconducting generator of motor systems.

Superconducting generator systems typically include a superconducting generator and a prime mover (e.g., a gas-turbine engine). The prime mover produces rotational energy, which is transmitted to the superconducting generator with a torque transfer tube. The torque tube mechanically transfers rotational energy from an output of the prime mover to an input of the superconducting generator to drive the generator. However, superconducting generators require rigorous control of heat transferred to a cryogenically-cooled rotor of the superconducting generator. Even with high-temperature superconductors, it is necessary to maintain temperatures at the rotor in the range of 30-40° K. The prime mover is necessarily at much high temperatures than the superconducting generator rotor. Often the prime mover has elevated temperatures. Heat transfer from the prime mover to the superconducting generator rotor through the torque tube is problematic.

The present invention provides a torque transfer assembly that permits torque transfer while reducing heat transfer through the assembly.

BRIEF SUMMARY OF THE INVENTION

A torque tube assembly for transmitting rotational force from a first end to a second end according to the present invention includes a number n of concentric elongate torque tubes, where n is an odd integer greater than or equal to three. The concentric elongate torque tubes are connected for co-rotation. A serpentine thermal conduction path is defined between the first end of the torque tube assembly and the second end of the torque tube assembly, and includes at least a portion of each of the concentric elongate torque tubes.

DETAILED DESCRIPTION

The present invention relates to a torque transfer assembly for transmitting torque between a prime mover and a superconducting generator (or superconducting motor and load) while reducing heat transfer through the torque transfer assembly, to thermally isolate the prime mover and the superconducting generator. The torque transfer assembly includes an odd number of concentric torque transfer tubes that are connected together to form a serpentine or labyrinthine thermal conduction path. A linear, physical length of the torque transfer assembly for torque transfer between the prime mover and the superconducting genrator is less than a thermal length of the torque transfer assembly, which is defined by the thermal conduction path.

Figure 1:
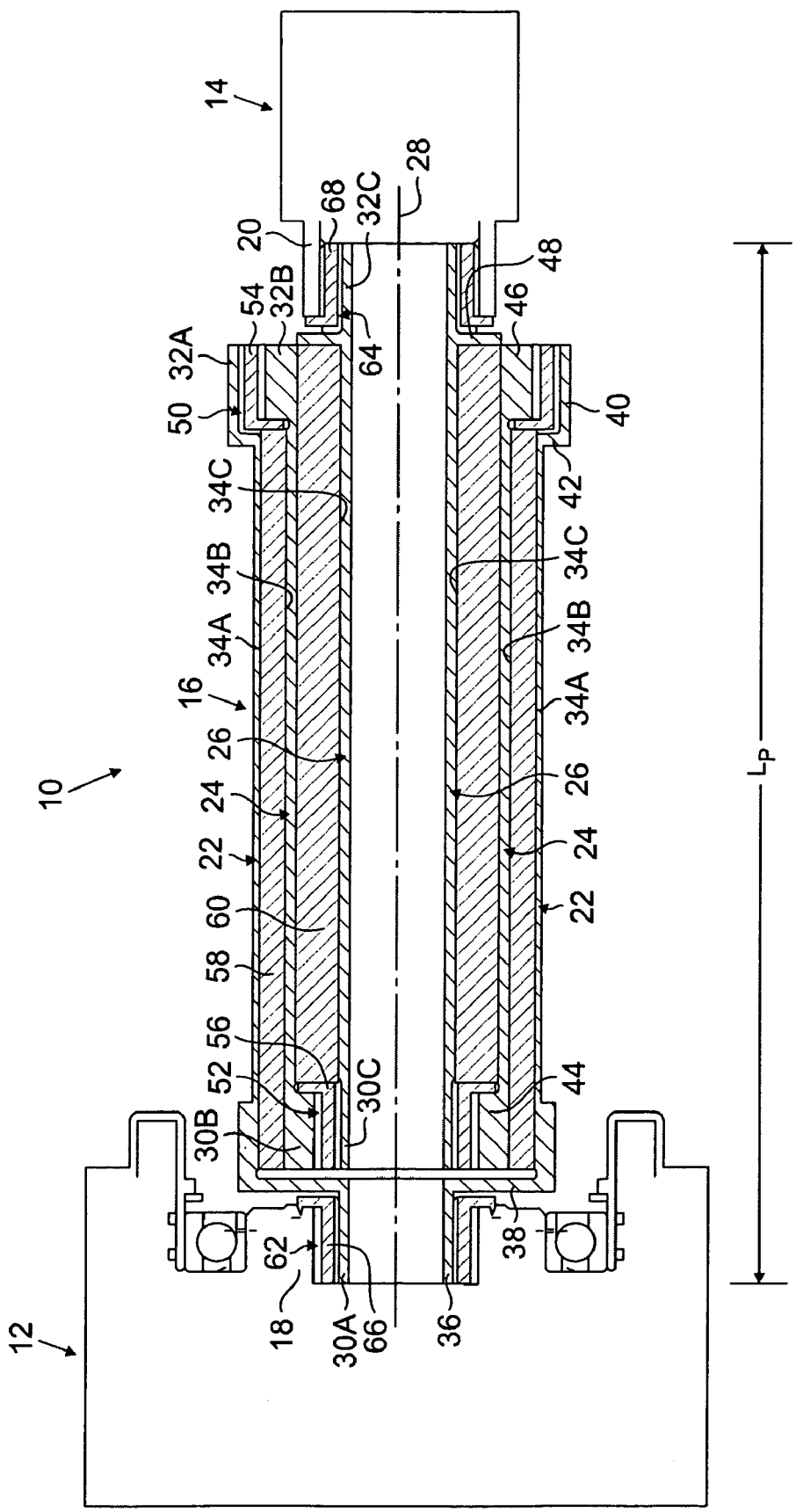
FIG. 1 is a cross-sectional view of a generator system that includes a prime mover, a superconducting generator and a torque transfer assembly according to the present invention.

FIG. 1 is a cross-sectional view of a generator system 10, which includes a superconducting generator 12 (shown schematically), a prime mover 14 (shown schematically), and a torque transfer assembly 16. The superconducting generator 12 includes an input 18 that can be connected to the torque transfer assembly 16 opposite the prime mover 14. The input 18 is connected to a cryogenically cooled rotor (not shown) having rotor windings.

The prime mover 14 can be any device for providing rotational energy, for example, a gas-turbine engine. The prime mover 14 includes an output 20 for connection to the torque transfer assembly 16. Torque can be transferred from the output 20 of the prime mover 14 to the input 18 of the superconducting generator 12 by the torque transfer assembly 16.

The torque transfer assembly 16 includes first, second and third concentric torque transfer tubes 22, 24 and 26 arranged in a nested configuration about a common axis of rotation 28. Each torque tube 22, 24 and 26 is-an elongate tube having a first end 30 and an opposite second end 32. Each torque transfer tube 22, 24 and 26 is a metallic tube having a thin-walled central portion 34 that has a wall thickness sufficient to carry the torque required for power transmission in a desired application, plus any desired safety margin. The torque tubes 22, 24 and 26 can have a central portion 34 with walls thicker than is strictly necessary for torque-carrying purposes, for manufacturing convenience. The torque transfer tubes 22, 24 and 26 can be formed of high-strength alloys such as Ti 6Al-4V, Inconel® 718 (a high strength austenitic nickel-chromium-iron alloy), and stainless steels.

The first torque tube 22 is the outermost tube of the assembly 16, and defines a first end 30A and an opposite second end 32A. A central portion 34A of the first torque tube 22 is generally cylindrical in shape. A first end portion 36 at the first end 30A of the first torque tube 22 is cylindrical and has a smaller diameter than the central portion 34A. A first connecting portion 38 is disposed to extend radially between the central portion 34A and the first end portion 36A. At the second end 32A of the first torque tube 22, a second end portion 40 is cylindrical and has a larger diameter than the central portion 34A. A second connecting portion 42 is disposed to extend radially between the central portion 34A and the second end portion 40.

The second torque tube 24 is arranged adjacent to and concentrically interior to the first torque tube 22, and defines a first end 30B, an opposite second end 32B and a central portion 34B therebetween. A radially inward-extending first end portion 44 is disposed at the first end 30B of the second torque tube 24, and a radially inward-extending second end portion 46 is disposed at the second end 32B of the second torque tube 24.

The third torque tube 26 is arranged adjacent to and concentrically interior to the second torque tube 24, and defines a first end 30C, an opposite second end 32C and a central portion 34C therebetween. A radially outward-extending flange 48 is disposed between the central portion 34C and the second end 32C of the third torque tube 26.

In further embodiments, additional concentric torque tubes can be used. The total number of torque tubes is an odd number, in order to provide an assembly that connects a first and a second end of the assembly for torque transfer therebetween.

Adjacent torque tubes are connected for simultaneous co-rotation. The first torque tube 22 and the second torque tube 24 are connected by a first spline connection 50 at their respective second ends 32A and 32B. The second torque tube 24 and the third torque tube 26 are connected by a second spline connection 52 at their respective first ends 30B and 30C. Splines formed on adjacent-torque tubes are torque-carrying connecting structures that permit mating mechanical engagement between adjacent torque tubes for transmitting rotational energy. First and second spline muffs 54 and 56 are located at the first and second spline connections 50 and 52, respectively, that function as torque-carrying thermal standoffs. The spline muffs 54 and 56 provide thermal insulation in a radial direction between adjacent torque tubes, and are configured so that metal-on-metal contact between adjacent torque tubes at the first and second spline connections 50 and 52 is avoided. The spline muffs 54 and 56 can be formed of unreinforced composite materials, such as polyimides (e.g., Vespel® available from DuPont Engineering Polymers, Newark, Del.) and polyamide-imides (e.g., Torlon® available from Solvay Advanced Polymers, Alpharetta, Ga.), or nearly any other material with low thermal conductivity. In one embodiment, the spline muffs 54 and 56 are each part no. 746579 spline adapters, available from Hamilton Sundstrand, Windsor Locks, Conn. However, use of spline muffs is optional. In further embodiments, direct metal-on-metal connections can be made.

Spacing volumes are provided between adjacent torque tubes. An outer spacing volume 58 is provided between the first and second torque tubes 22 and 24, and an inner spacing volume 60 is provided between the second and third torque tubes 24 and 26. The radial dimensions of the spacing volumes 58 and 60 can be selected to facilitate assembly the torque transfer assembly. For instance, to facilitate insertion of spline connections during fabrication. As shown in FIG. 1, the spacing volumes 58 and 60 are each filled with a thermally insulating filler rnaterial, such as a material similar to those discussed above with respect to the spline muffs 54 and 56. The flange 48 of the third torque tube 26 helps retain filler-material in the spacing volume 60. The filler material can provide radial support between adjacent torque tubes.

The first end of the torque tube assembly 16 is connected to the input 18 of the superconducting generator 12 and the second end of the torque tube assembly 16 is connected to the output 20 of the prime mover 14. A third spline connection 62 is provided at the first end portion 36 at the first end 30A of the first torque transfer tube 22 for engaging the input 18 of the generator 12. A fourth spline connection 64 is provided at the second end 32C of the third torque transfer-tube 26 for engaging the output 20 of the prime mover 14. Third and fourth spline muffs 66 and 68 are provided at the third and fourth spline connections 62 and 64, respectively. In further embodiments, other types of connections can be used to mechanically engage the torque transfer assembly 16 with the input 18 of the generator 12 and the output 20 of the prime mover 14.

A thermal conduction path is defined through the torque transfer assembly 16, and is the path along which heat is conducted through the assembly 16 between its opposite ends. In the embodiment shown in FIG. 1, the thermal conduction path begins at the third spline connection 62 and continues through the first torque tube 22, from its first end 30A to its second end 32A, to the first spline connection 50. From the first spline connection 50, the thermal conduction path continues through the second torque tube 24, from its second end 32B to its first end 30B, to the second spline connection 52. From the second spline connection 52, the thermal conduction path continues through the third torque tube 26, from its first end 30C to its second end 32C, to the fourth spline connection 64. It should be understood that the thermal conduction path passes through the spline muffs 54, 56, 66 and 68, which merely provide thermal resistance at the spline connections 50, 52, 62 and 64. The thermal conduction path has a serpentine or labyrinthine shape, conducting heat through the concentric torque tubes in succession. It should be noted that other thermal conduction paths could be defined (e.g., a radial path through spacing volumes 58 and 60); however, the thermal conduction path described above generally relates to the path of least thermal resistance.

A physical length $L_P$ of the torque transfer assembly 16 is defined as the longest linear distance between the first end 30 of one of the torque tubes and a second end 32 of one of the torque tubes of the torque transfer assembly 16. For instance, in FIG. 1, the physical length $L_P$ is defined between the first end 30A of the first torque tube 22 and the second end 32C of the third torque tube 26. Generally speaking, the physical length $L_P$ corresponds to the the overall length of the torque transfer assembly 16 as defined by the distance between connections to the input 18 of the superconducting generator 12 and to the output 20 of the prime mover 14.

A thermal length $L_T$ is defined as a collective length of a thermal conduction path between the opposite ends of the torque transfer assembly 16, where the torque transfer assembly 16 connects to the input 18 of the generator 12 and the output 20 of the prime mover 14. According to the present invention, the thermal length $L_T$ of the torque transfer assembly 16 is greater than its physical length $L_P$. Connections between the concentric torque tubes 22, 24 and 26, as described above, create a. serpentine or labyrinthine thermal conduction path between the opposite ends of the torque transfer assembly 16. Because thermal resistance is inversely related to cross-sectional area and is directly related to length for conduction heat transfer, the torque transfer assembly 16 increases the thermal resistance by utilizing thin-walled torque tubes 22, 24 and 26 that are arranged to increase the thermal length $L_T$ of the assembly 16.

Figure 2:
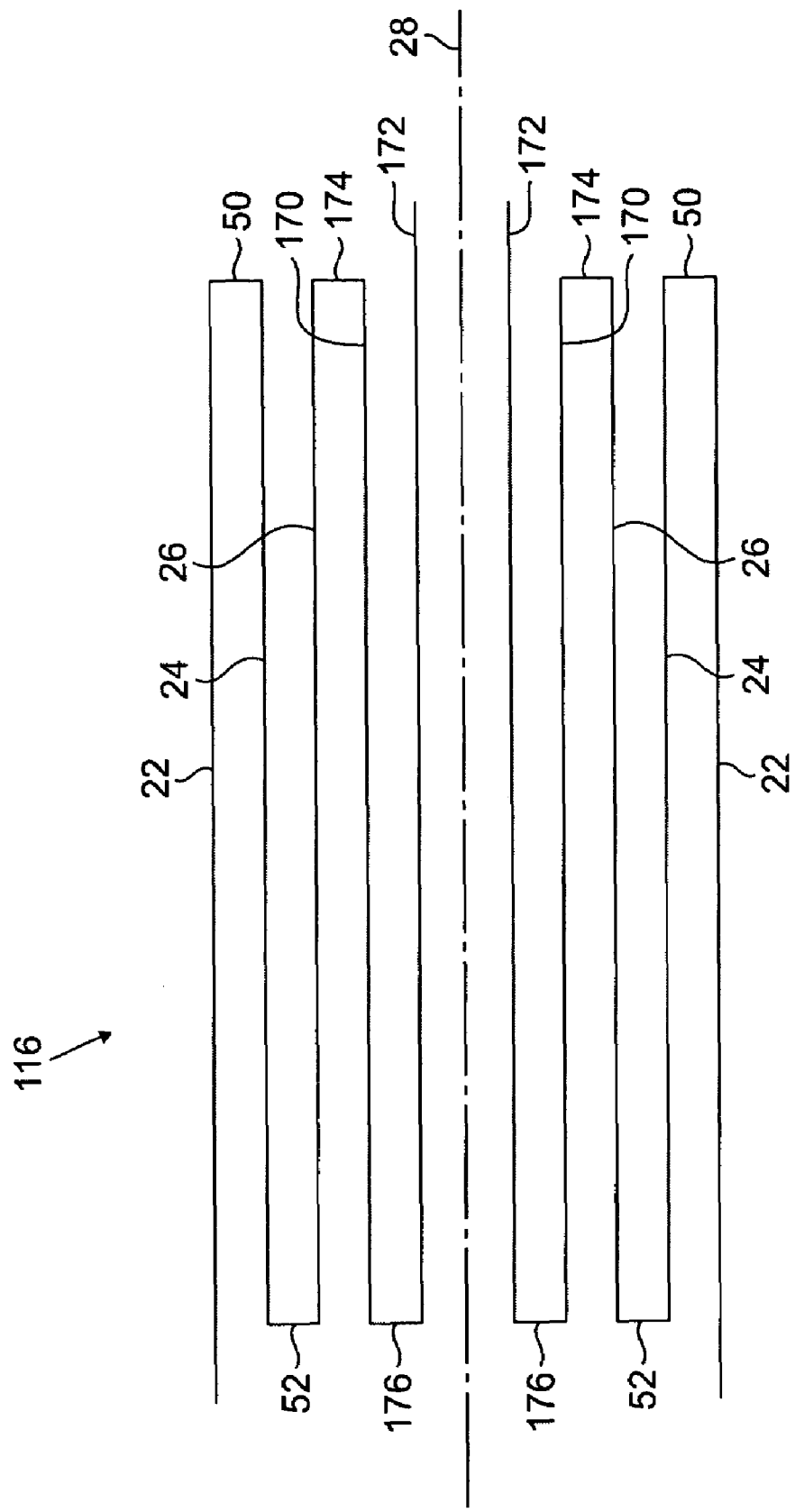
FIG. 2 is a simplified schematic cross-sectional view of another embodiment of a torque transfer assembly according to the present invention.

In further embodiments, additional concentric torque tubes can be used. The total number of torque tubes is an odd number, in order to provide an assembly that connects a first and a second end of the assembly for torque transfer therebetween. FIG. 2 is a simplified cross-sectional schematic view illustrating another embodiment of a torque transfer assembly 116 having first 22, second 24, third 26, fourth 170 and fifth 172 torque tubes and first 50, second 52, third 174 and fourth 176 spline connections. The torque transfer assembly 116 is generally similar to assembly 16, with two additional concentric torque tubes connected for co-rotation.

It should be recognized that the present invention provides numerous advantages. The torque transfer assembly of the present invention is relatively simple and efficient to construct, for instance, by allowing the use of known materials. Thermal isolation between the prime mover and the superconducting generator is provided, while simultaneously providing suitable torque transmission capabilities. In addition, the thermal length of the torque transfer assembly is increased without requiring a corresponding increase in the physical length of the assembly, which reduces space required for the generator system.

Although the present invention has been described with reference to several alternative embodiments, workers skilled in the art will recognize that changes may be made in form and detail without departing from the spirit and scope of the invention. For instance, the torque tubes need not be strictly cylindrical in shape, but can have other shapes and configurations (e.g., tapered tubes). In addition, the arrangement of the torque transfer assembly can be reversed (i.e., flipped left-to-right as shown in FIG. 1) with respect to a generator and a prime mover, such that opposite ends of the torque transfer assembly connect to the generator and the prime mover. Also, the torque tube assembly of the present invention can be used in other contexts, for example, with a superconducting motor and load.

What is claimed is:

1. A torque tube assembly for transmitting rotational force from a first end to a second end, the assembly comprising:
 a number n of concentric elongate torque tubes, wherein n is an odd integer greater than or equal to three;
 wherein the concentric elongate torque tubes are connected for co-rotation, and
 wherein a serpentine thermal conduction path is defined between the first end of the torque tube assembly and the second end of the torque tube assembly and includes at least a portion of each of the concentric elongate torque tubes.

2. The assembly of claim 1, wherein the concentric elongate torque tubes each comprise a metallic material.

3. The assembly of claim 1, wherein the adjacent concentric elongate torque tubes are connected by a spline connection formed with an associated spline muff, and wherein adjacent concentric elongate torque tubes connected by spline connections are connected only relative to a first end or a second end of the assembly.

4. The assembly of claim 3, wherein each spline muff is formed of a material having low thermal conductivity.

5. The assembly of claim 1 and further comprising:
 a filler material having low thermal conductivity, wherein the filler material is disposed between two adjacent concentric elongate torque tubes to provide radial support therebetween.

6. The assembly of claim 1, wherein a spacing volume is defined between two adjacent elongate torque tubes.

7. A torque tube assembly for transmitting rotational force between a first end and a second end of the assembly, the assembly comprising:
 a first torque tube, wherein the first torque tube defines a first end and an opposite second end;
 a second torque tube arranged concentrically interior to the first torque tube, wherein the second torque tube defines a first end and an opposite second end;
 a third torque tube arranged concentrically interior to the second torque tube, wherein the third torque tube defines a first end and an opposite second end;
 a first connecting structure connecting the respective second ends of the first torque tube and the second torque tube for co-rotation; and
 a second connecting structure connecting the respective first ends of the second torque tube and the third torque tube for co-rotation.

8. The assembly of claim 7 and further comprising:
 an additional connecting structure disposed at the first end of the first torque tube.

9. The assembly of claim 7 and further comprising:
 an additional connecting structure disposed at the second end of the third torque tube.

10. The assembly of claim 7, wherein the first and second connecting structures are spline connection structures.

11. The assembly of claim 7 and further comprising:
 a fourth torque tube arranged concentrically interior to the third torque tube, wherein the fourth torque tube defines a first end and an opposite second end;
 a fifth torque tube arranged concentrically interior to the fourth torque tube, wherein the fifth torque tube defines a first end and an opposite second end;
 a third connecting structure connecting the respective second ends of the third torque tube and the fourth torque tube; and
 a fourth connecting structure connecting the respective first ends of the fourth torque tube and the fifth torque tube.

12. The assembly of claim 7, wherein each torque tube is formed of a metallic material.

13. The assembly of claim 7, wherein each connecting structure includes a separator formed of a material having low thermal conductivity.

14. The assembly of claim 7, wherein a thermal conduction path is defined from the first torque tube to the first connecting structure to the second torque tube to the second connecting structure to the third torque tube.

15. The assembly of claim 7 and further comprising:
 a spacing volume is defined between any two adjacent torque tubes; and
 a filler material having low thermal conductivity, wherein the filler material is disposed in the spacing volume to provide radial support between adjacent torque tubes.

16. The assembly of claim 7, wherein each torque tube is cylindrical.

17. A dynamoelectric system comprising:
 a prime mover for providing a rotational output;
 a torque tube assembly connected to the prime mover for transmitting the rotational output about an axis, the torque tube assembly comprising:
  a plurality of concentric elongate torque tubes each defining a first end and an opposite second end;
  spacing volumes defined between adjacent torque tubes; and
  a connecting structure associated with each torque tube for connecting adjacent torque tubes for co-rotation; and
 a generator assembly having a superconducting generator rotor connected to the torque tube assembly opposite the prime mover for accepting the rotational output, wherein the connecting structures associated with the torque tubes define a serpentine thermal path through the torque tubes from the prime mover to the generator assembly.

18. The system of claim 17 and further comprising:
 a filler material disposed in each spacing volume for providing radial support between the adjacent torque tubes, wherein the filler material is has a low thermal conductivity.

19. The system of claim 17, wherein each connecting structure includes a separator formed of a material having low thermal conductivity.

20. The system of claim 17, wherein a physical length of the torque tube assembly is less than half of a thermal length of the torque tube assembly, the thermal length defined by the thermal path.

* * * * *